US009071731B2

(12) United States Patent
Sakamoto

(10) Patent No.: US 9,071,731 B2
(45) Date of Patent: Jun. 30, 2015

(54) IMAGE DISPLAY DEVICE FOR REDUCING PROCESSING LOAD OF IMAGE DISPLAY

(75) Inventor: Akihiko Sakamoto, Sagamihara (JP)

(73) Assignee: OLYMPUS CORPORATION, Tokyo (JP)

( * ) Notice: Subject to any disclaimer, the term of this patent is extended or adjusted under 35 U.S.C. 154(b) by 565 days.

(21) Appl. No.: 13/450,031

(22) Filed: Apr. 18, 2012

(65) Prior Publication Data

US 2012/0268605 A1 Oct. 25, 2012

(30) Foreign Application Priority Data

Apr. 25, 2011 (JP) .................................. 2011-097128

(51) Int. Cl.
*H04N 7/18* (2006.01)

(52) U.S. Cl.
CPC ..................................... *H04N 7/181* (2013.01)

(58) Field of Classification Search
CPC ............ H04N 7/181; H04N 19/00751; H04N 21/2187; H04N 21/431; H04N 21/4423; H04N 19/00127; G08B 13/19667; G08B 13/19693
USPC ........................................................ 348/159
See application file for complete search history.

(56) References Cited

U.S. PATENT DOCUMENTS

| 2001/0026318 | A1* | 10/2001 | Yonezawa et al. ............ 348/159 |
| 2001/0050679 | A1* | 12/2001 | Shigeta .......................... 345/204 |
| 2002/0097322 | A1* | 7/2002 | Monroe et al. ................ 348/159 |
| 2002/0154699 | A1* | 10/2002 | Yamaguchi et al. ..... 375/240.25 |
| 2003/0048356 | A1 | 3/2003 | Kohno et al. |
| 2003/0174243 | A1* | 9/2003 | Arbeiter et al. ............ 348/384.1 |
| 2003/0195977 | A1* | 10/2003 | Liu et al. ........................ 709/231 |
| 2004/0183917 | A1* | 9/2004 | von Flotow et al. ..... 348/208.99 |
| 2004/0237103 | A1* | 11/2004 | Kondo et al. .................... 725/37 |
| 2005/0152397 | A1* | 7/2005 | Bai et al. ....................... 370/468 |

(Continued)

FOREIGN PATENT DOCUMENTS

| JP | 2000-101994 A | 4/2000 |
| JP | 2001-356753 A | 12/2001 |

(Continued)

OTHER PUBLICATIONS

Notice of Reasons for Rejection dated Dec. 19, 2014, issued in corresponding Japanese Application No. 2011-097128. w/English translation. (7 pages).

*Primary Examiner* — Richard Torrente
*Assistant Examiner* — Joseph Suh
(74) *Attorney, Agent, or Firm* — Westerman, Hattori, Daniels & Adrian, LLP

(57) ABSTRACT

An image display device may include a communication unit that receives frame images sequentially transmitted from image pickup devices, a display unit that displays the frame images, a storage unit that stores processible information on an amount of the frame images and priority information indicating priorities of the frame images, an acquisition unit that acquires status information, a determination unit that determines a data amount of the frame images transmitted by each of the image pickup devices within a predetermined period of time based on the processible information and the priority information stored in the storage unit and the status information acquired by the acquisition unit, and a control unit that performs control that causes information corresponding to the data amount determined by the determination unit to be transmitted from the communication unit to each of the plurality of image pickup devices.

8 Claims, 11 Drawing Sheets

(56) References Cited

U.S. PATENT DOCUMENTS

| | | | |
|---|---|---|---|
| 2005/0262258 A1* | 11/2005 | Kohno et al. | 709/231 |
| 2006/0067654 A1* | 3/2006 | Herberger et al. | 386/120 |
| 2006/0104345 A1* | 5/2006 | Millar et al. | 375/240.01 |
| 2007/0067528 A1* | 3/2007 | Schaffer et al. | 710/116 |
| 2007/0288667 A1* | 12/2007 | Kamata et al. | 710/65 |
| 2008/0057894 A1* | 3/2008 | Aleksic et al. | 455/187.1 |
| 2009/0059853 A1* | 3/2009 | Kim et al. | 370/329 |
| 2009/0193167 A1* | 7/2009 | Chen | 710/244 |
| 2010/0064260 A1* | 3/2010 | Amano | 715/859 |
| 2010/0135381 A1* | 6/2010 | Hamamoto et al. | 375/240.01 |
| 2012/0042110 A1* | 2/2012 | Nakazono et al. | 710/305 |
| 2013/0011014 A1* | 1/2013 | Jin et al. | 382/103 |

FOREIGN PATENT DOCUMENTS

| | | |
|---|---|---|
| JP | 2005-167440 A | 6/2005 |
| JP | 2005-347942 A | 12/2005 |
| JP | 2006-238017 A | 9/2006 |
| JP | 2007-036615 A | 2/2007 |
| JP | 2008-147997 A | 6/2008 |

* cited by examiner

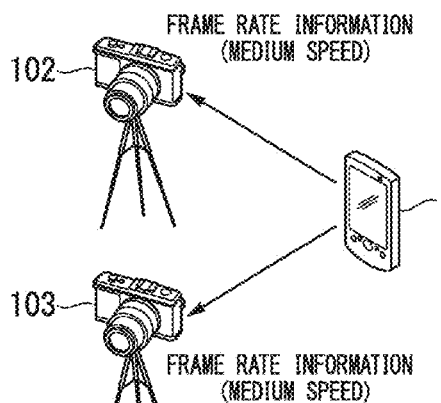
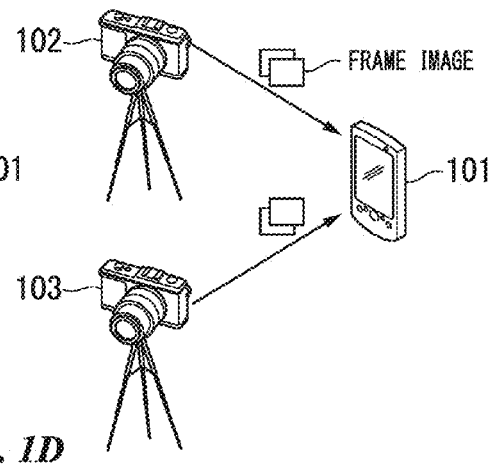
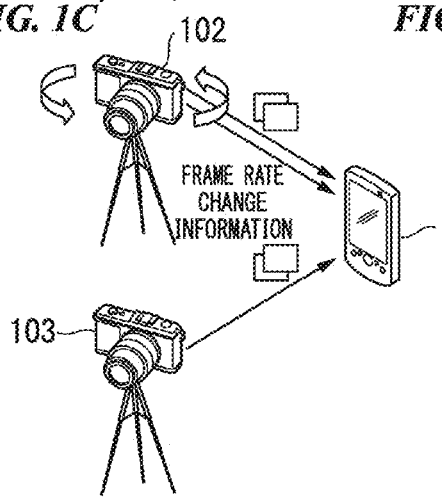
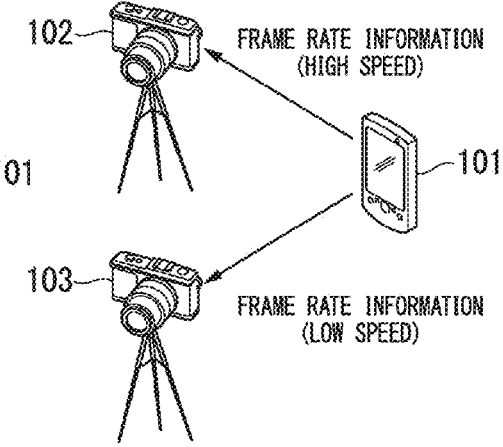
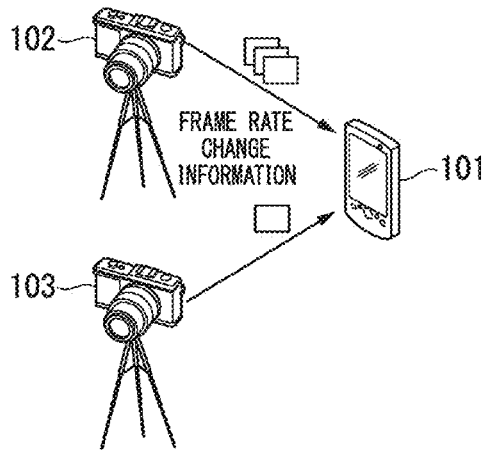

*FIG. 10*

| ITEMS | DETAILS | PRIORITY |
|---|---|---|
| FRAMING | PAN | 10 |
| | TILT | 10 |
| | ZOOM | 5 |
| | WIDE | 5 |
| | FOCUS | 5 |
| | ⋮ | ⋮ |
| SUBJECT RECOGNITION | UNRECOGNIZABLE | 10 |
| | IN MOTION | 5 |
| | NOT IN MOTION | 1 |
| | ⋮ | ⋮ |
| OTHERS | VOLUME CHANGE | 1 |
| | ⋮ | ⋮ |

IMAGE DISPLAY DEVICE FOR REDUCING PROCESSING LOAD OF IMAGE DISPLAY

BACKGROUND OF THE INVENTION

1. Field of the Invention

The present invention relates to an image display device that receives frame images from a plurality of image pickup devices and displays the received frame images.

Priority is claimed on Japanese Patent Application No. 2011-097128, filed Apr. 25, 2011, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

Japanese Unexamined Patent Application, First Publication No. 2001-356753 discloses a technique of reducing an amount of information on a network when a plurality of videos are transmitted and received via the network. In a display control system disclosed in Japanese Unexamined Patent Application, First Publication No. 2001-356753, when images are displayed on a plurality of display areas on a screen of an image display device based on video signals from a plurality of signal sources, respectively, image display attribute information and display signal selection information of each display area are transmitted to each signal source from the image display device, and, based on the resolution of the display area added to the image display attribute information received at a signal source side, the video signal, in which information content is reduced in advance, is transmitted to the image display device from each signal source. Thereby, it is possible to reduce an amount of information on a network.

When the plurality of videos are transmitted/received, if the amount of information of the plurality of transmitted videos exceeds an amount of processible information at the reception side, since deletion, or the like, of the frame of the videos displayed on the image display device may occur, the amount of information of the transmitted videos may be reduced, and a processing load of the reception side may be reduced. The above-mentioned display control system reduces the amount of information of the video signal from the signal source based on resolution of the plurality of display areas on the screen of the image display device. Since the display control system reduces the amount of information of the video signal from the signal source based on the resolution of the display area, with regard to the video displayed on the display area having a low resolution, even in the video signal in which a user of the display control system requires the amount of information, only the video in which the amount of information has been reduced is displayed.

SUMMARY

The present invention provides an image display device capable of reducing a processing load related to an image display and performing image display in which image priority is reflected.

An image display device may include: a communication unit configured to receive frame images sequentially transmitted from each of a plurality of image pickup devices; a display unit configured to display the frame images from each of the plurality of image pickup devices that have been received by the communication unit; a storage unit configured to store processible information on an amount of the frame images that can be processed within a predetermined period of time, and store priority information indicating priorities of the frame images previously determined with respect to a photographing operation, a photographing environment, or a state of a photographed subject related to the frame images that have been received by the communication unit; an acquisition unit configured to acquire status information indicating the photographing operation, the photographing environment, or the state of the photographed subject for each of the image pickup devices; a determination unit configured to determine a data amount of the frame images transmitted by each of the image pickup devices within a predetermined period of time based on the processible information and the priority information stored in the storage unit and the status information acquired by the acquisition unit; and a control unit configured to perform control that causes information corresponding to the data amount determined by the determination unit to be transmitted from the communication unit to each of the plurality of image pickup devices.

The acquisition unit may acquire the status information based on data transmitted from the image pickup device with the frame image.

The image display device may further include: a remote operation unit configured to instruct the photographing operation with respect to the image pickup device. The acquisition unit may acquire the status information based on the photographing operation instructed by the remote operation unit.

The image display device may further include: an analysis unit configured to analyze a displacement amount of the photographed subject based on the frame image. The acquisition unit acquires the status information based on a result of the analysis by the analysis unit.

The status information may be information on a framing operation of the image pickup device.

The status information may be information on a sound volume detected by the image pickup device.

The status information may be information on whether the subject present in the frame image is recognizable.

The status information may be information on a movement amount in the frame image of the subject present in the frame image.

According to the present invention, since a data amount of the frame image transmitted by each of the image pickup devices within a predetermined period is determined based on processible information, priority information and status information, the processing load related to the image display can be reduced and image display in which the image priority is reflected can be performed.

BRIEF DESCRIPTION OF THE DRAWINGS

The above features and advantages of the present invention will be more apparent from the following description of certain preferred embodiments taken in conjunction with the accompanying drawings, in which:

FIGS. 1A to 1E are system configuration diagrams illustrating a control method in accordance with a first preferred embodiment of the present invention;

FIG. 10 is a reference view illustrating a priority table in accordance with the first preferred embodiment of the present invention;

DETAILED DESCRIPTION OF THE PREFERRED EMBODIMENTS

Figure 2:
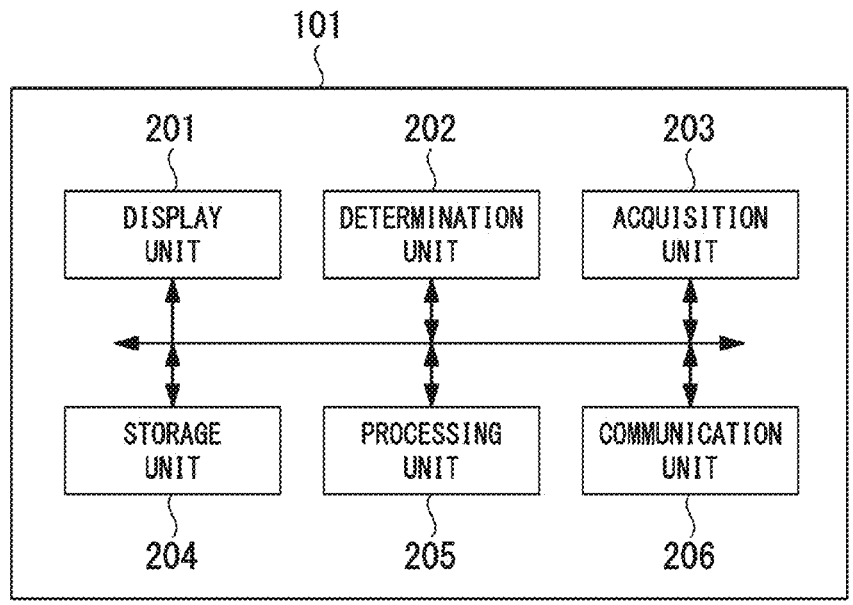
FIG. 2 is a block diagram illustrating a configuration of a display terminal in accordance with the first preferred embodiment of the present invention.

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated for explanatory purpose.

Hereinafter, a first preferred embodiment of the present invention will be described with reference to the accompanying drawings. FIGS. 1A to 1E show examples of a control method of a display control system equipped with an image pickup device and a display terminal (an image display device) in accordance with the first preferred embodiment of the present invention. In FIG. 1, a display terminal 101 receives and displays real-time videos transmitted from image pickup devices 102 and 103, respectively. In the control method in accordance with the first preferred embodiment of the present invention, based on image pickup device displacement data added to frame rate change information illustrating a change instruction of a frame rate and a maximum processable amount of the display terminal 101, the frame rate (a data amount of the frame image transmitted by each image pickup device within one frame) of the real-time video transmitted to the display terminal 101 from each of the image pickup devices is controlled, and thus, a load of the display terminal 101 is reduced.

In addition, the frame rate change information in accordance with the first preferred embodiment of the present invention is information transmitted from the image pickup devices 102 and 103 (hereinafter, in the first preferred embodiment, this will be referred to as simply an "image pickup device" unless it indicates a specific image pickup device") to the display terminal 101, and information including at least image pickup device displacement data. Further, the image pickup device displacement data in the first preferred embodiment is data indicating a state of a photographing situation or a state of a photographing environment of each image pickup device, and a state of a subject captured by the image pickup device.

In addition, a photographing situation of the image pickup device in the first preferred embodiment means a situation (state) of a framing operation (photographing manipulation) such as pan and tilt, focus, and zoom-wide manipulations, a state of a photographing environment means a displacement amount of a sound volume in surroundings, and a state of a subject means whether the subject is recognized or not (whether the subject is recognizable or not), and a movement amount (a displacement amount), or the like, in the frame image of the subject present in the frame image.

Further, a maximum processable amount in the first preferred embodiment means a maximum number of frame images for which reception-display process is possible by the display terminal 101 within a predetermined time. Furthermore, a real-time video in the first preferred embodiment means a video photographed by the image capturing unit of the image pickup device, and a video configured by data of a frame image of each frame, which is generated in time sequence, and sequentially stored by a storage unit of the image pickup device.

In the examples shown in FIGS. 1A to 1E, examples of a control method in a situation in which a real-time video is transmitted from the image pickup devices 102 and 103 to the display terminal 101 with a frame rate determined by the display terminal 101, based on the number of terminals of the image pickup device and the maximum processable amount of the display terminal 101, are shown. In this situation, when the framing operation is performed in the image pickup device 102, frame rate change information is transmitted from the image pickup device 102 to the display terminal 101. Based on the image pickup device displacement data added to the frame rate change information transmitted from the image pickup device 102 and the maximum processable amount, the frame rate of each of the image pickup devices is re-determined by the display terminal 101. As the frame rate information indicating the re-determined frame rate of each of the image pickup devices is transmitted to the image pickup devices 102 and 103 from the display terminal 101, the frame rate of the real-time video transmitted from the image pickup devices 102 and 103 to the display terminal 101 is controlled at the frame rate represented by the frame rate information.

In addition, the frame rate information in the first preferred embodiment is information transmitted to the image pickup devices 102 and 103 from the display terminal 101, and information including at least information that designates the frame rate of the real-time video transmitted from the image pickup devices 102 and 103 to the display terminal 101.

An example shown in FIG. 1A represents a situation in which the frame rate information determined by the display terminal 101 is transmitted to the image pickup devices 102 and 103 from the display terminal 101 based on the number of terminals of the image pickup device and the maximum processable amount of the display terminal 101. An example shown in FIG. 1B represents a situation in which the real-time video is transmitted at the frame rate indicating the frame rate information received by the display terminal 101 from the image pickup devices 102 and 103. An example shown in FIG. 1C represents a situation in which the framing operation is performed in the image pickup device 102, and the frame rate change information is transmitted from the image pickup device 102 to the display terminal 101.

An example shown in FIG. 1D represents a situation in which the frame rate information re-determined by the display terminal 101 based on the image pickup device displacement data added to the frame rate change information received in FIG. 1C is transmitted to the image pickup device from the display terminal 101. An example shown in FIG. 1E represents a situation in which the real-time video is transmitted at the frame rate represented with the frame rate information re-received by the display terminal 101 from the image pickup devices 102 and 103.

In addition, in the examples of FIGS. 1A to 1E, since the framing operation is performed by the image pickup device 102 only, while the frame rate of the image pickup device 102 is set to be high, the image pickup device in which the frame rate is set to be high is not limited to only one terminal. For example, when the framing operation is performed by the plurality of image pickup devices, there may be a plurality of image pickup devices in which the frame rate is set to be high, and when there is no image pickup device in which the framing operation is performed, the state shown in FIG. 1B may be maintained.

Further, in the examples of FIGS. 1A to 1E, while the frame rate change information is transmitted from the image pickup device 102 to the display terminal 101 under the condition that the framing operation of the image pickup device 102 is performed, the conditions under which the frame rate change information is transmitted are not limited to the above condition. For example, the frame rate change information may be transmitted when there is a variation in determination of whether the subject is recognized by image pickup device, a movement amount in the frame image of the subject present in the frame image, or a change in sound volume detected by the image pickup device.

FIG. 2 shows of a configuration of the display terminal 101 in accordance with the first preferred embodiment of the present invention. Hereinafter, the configuration of the display terminal 101 will be described with reference to FIG. 2. The display terminal 101 in accordance with the first preferred embodiment includes a display unit 201, a determination unit 202, an acquisition unit 203, a storage unit 204, a processing unit 205 (a control unit), and a communication unit 206.

The display unit 201 displays a frame image received by the communication unit 206. The determination unit 202 determines a frame rate of each of the image pickup devices based on the maximum processible amount, the number of image pickup devices that transmit the real-time videos, some or all of the image pickup device displacement data, and the priority information for determining priority of the image pickup devices.

The acquisition unit 203 analyzes the frame rate change information received by the communication unit 206, and acquires the image pickup device displacement data of each of the image pickup devices. The storage unit 204 stores the frame image, the maximum processible amount, the number of image pickup devices that transmit the real-time videos, the frame rate change information, the frame rate information, and a priority table. In addition, the priority table in accordance with the first preferred embodiment of the present invention is previously determined with respect to all data that configures the image pickup device displacement data, and is a table illustrating the weight of the priority of the frame image. The processing unit 205 controls the operation of the display terminal 101. The communication unit 206 performs communication with the image pickup device.

Figure 3:
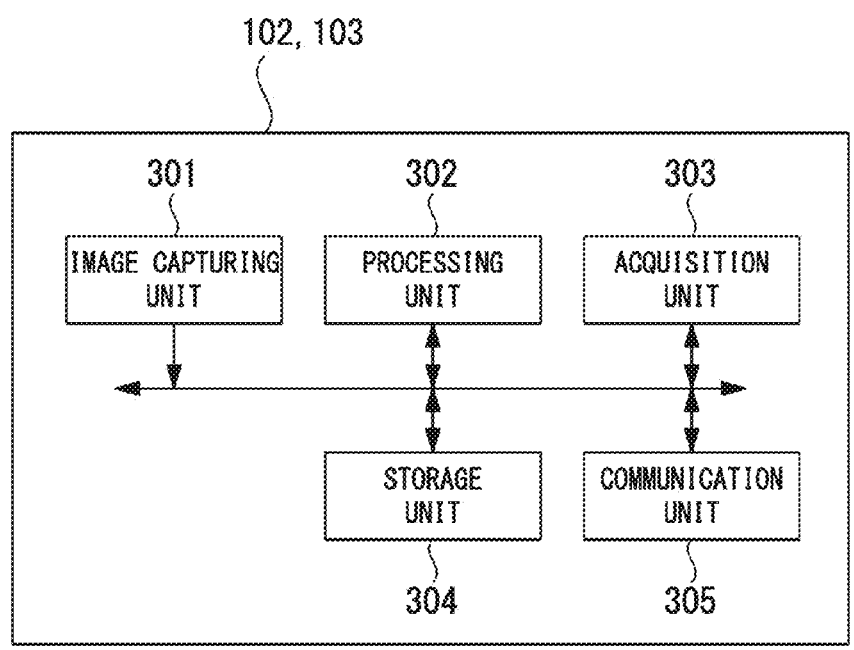
FIG. 3 is a block diagram illustrating a configuration of an image pickup device in accordance with the first preferred embodiment of the present invention.

FIG. 3 shows a configuration of the image pickup device in accordance with the first preferred embodiment of the present invention. The configuration of the image pickup device will be described with respect to FIG. 3. The image pickup device in accordance with the first preferred embodiment of the present invention includes an image capturing unit 301, a processing unit 302, an acquisition unit 303, a storage unit 304, and a communication unit 305.

The image capturing unit 301 generates the frame image obtained by photographing the subject, and acquires the real-time video. The processing unit 302 controls the operation of the image pickup device. The acquisition unit 303 performs acquisition of the image pickup device displacement data and generation of the frame rate change information. The storage unit 304 stores the real-time video, the frame rate information, the number of image non-transmissions, and a maximum obtainable amount. The communication unit 305 performs communication with the display terminal 101. In addition, the number of image non-transmissions is the number of times to skip a transmission process for frame images to be transmitted from the image pickup device to the display terminal 101. In addition, the maximum obtainable amount in accordance with the first preferred embodiment of the present invention is information indicating the frame rate of the real-time video obtained by the image pickup device.

Figure 4:
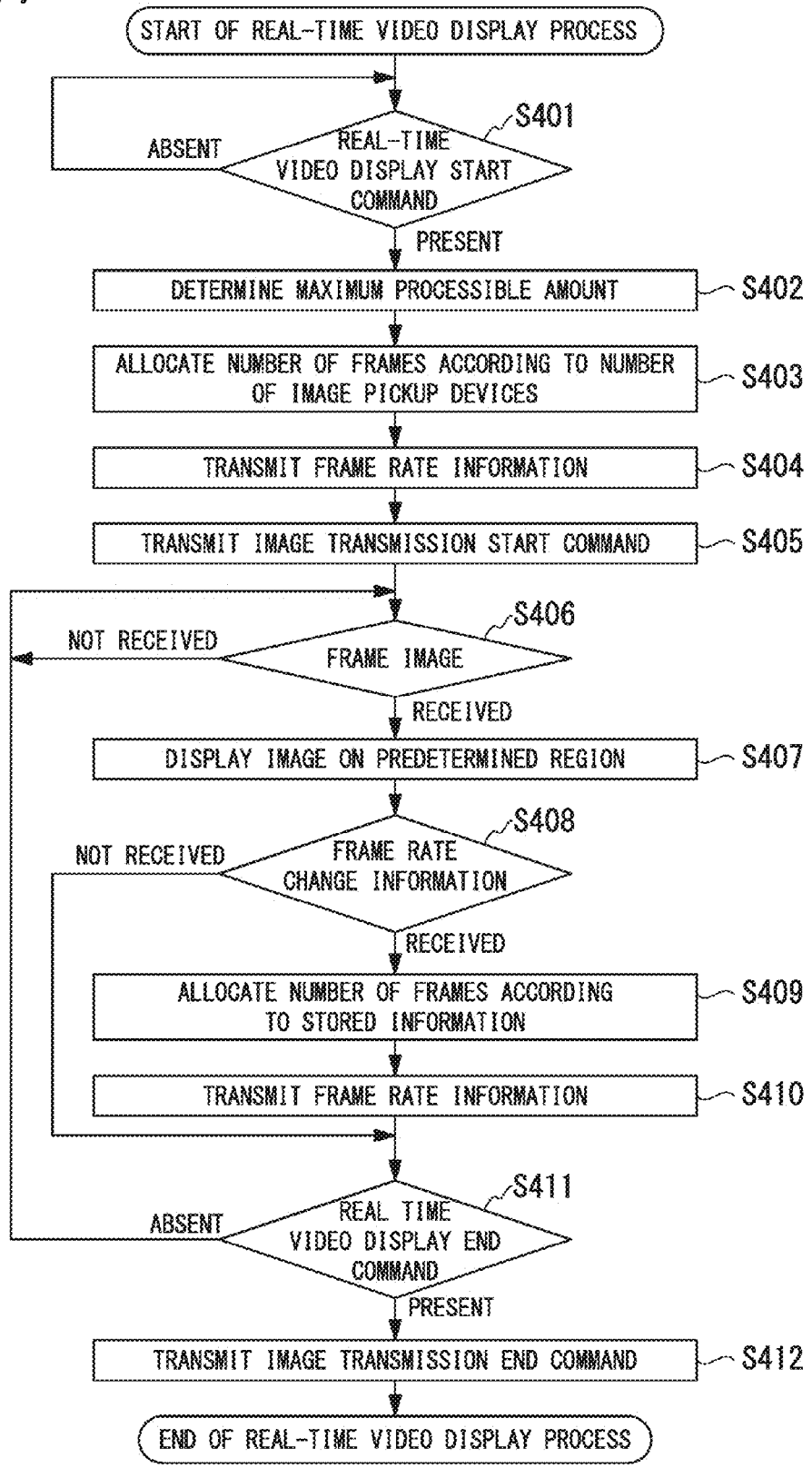
FIG. 4 is a flowchart illustrating a sequence of operations of a display terminal in accordance with the first preferred embodiment of the present invention.

FIG. 4 shows the operation of the display terminal 101 in accordance with the first preferred embodiment of the present invention. Hereinafter, the operation of the display terminal 101 will be described with reference to FIG. 4.

The processing unit 205 starts a real-time video display process when a real-time video display start command is received (step S401). In addition, the real-time video display start command in accordance with the first preferred embodiment of the present invention is a command that allows the display terminal 101 to start the real-time video display process, and a command that is issued under a condition in which the image pickup device and the display terminal 101 belong to the same network. The condition under which the command is issued is not limited to the above condition. For example, the command may be issued under the condition that information related to an instruction of command issuance be received from the image pickup devices belonging to the same network via the communication unit 206, or the command may be issued under the condition that a user interface unit further included in the configuration of the display terminal shown in FIG. 2 and the command is issued by a user input.

The processing unit 205 determines the maximum processible amount when the real-time video display process is started, and stores the amount in the storage unit 204 (step S402). The processing unit 205 issues a frame rate information generation command to the determination unit 202 after storage of the maximum processible amount.

In addition, while the maximum processible amount in accordance with the first preferred embodiment of the present invention is a value determined by the processing unit 205, the information pre-stored in the storage unit 204 may be used. Further, for example, provided that a communication speed is X and a data amount of one frame of the frame image that configures the real-time video is Y, the maximum processible amount in accordance with the first preferred embodiment of the present invention may be obtained by calculating X/Y. Furthermore, the frame rate information generation command in accordance with the first preferred embodiment of the present invention is a command issued to the determination unit 202 from the processing unit 205, and a command that allows the determination unit 202 to generate the frame rate information.

When the frame rate information generation command is received from the processing unit 205, the determination unit 202 determines the frame rate of the real-time video transmitted to the display terminal 101 from each of the image pickup devices based on the number of image pickup devices that transmit the real-time videos and the maximum processible amount stored in the storage unit 204, and stores the determined frame rate as the frame rate information in the storage unit 204 (step S403). The determination unit 202 issues a frame rate information storage termination notice that notifies the processing unit 205 of completion of storage of the frame rate information after storage of the frame rate information. In addition, the number of image pickup devices that transmit the real-time videos can be obtained from the information (beacon, etc.) transmitted from the image pickup devices under the condition that the image pickup devices and the display terminal 101 belong to the same network.

Figure 5:
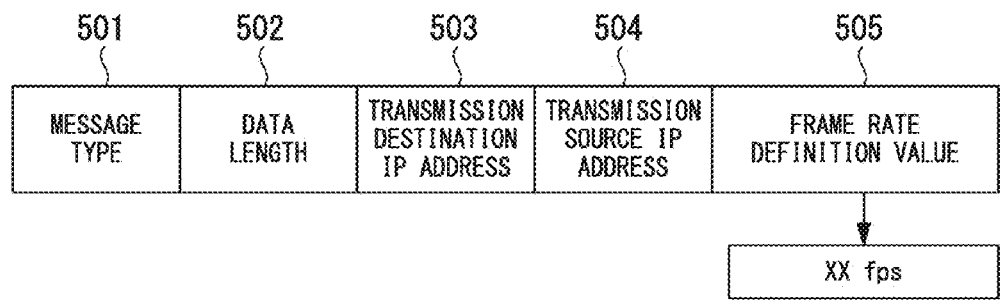
FIG. 5 is a reference view illustrating a data format of frame rate information in accordance with the first preferred embodiment of the present invention.

Further, the frame rate information is information configured in a data format shown in FIG. 5. The data format of the frame rate information will be described later. Furthermore, the method of determining the frame rate in step S403 will be described later.

The processing unit 205 transmits the frame rate information stored in the storage unit 204 to each of the image pickup devices via the communication unit 206 when the frame rate information storage termination notice is received from the determination unit 202 (step S404). The processing unit 205 transmits an image transmission start command to each of the image pickup devices via the communication unit 206 after transmission of the frame rate information (step S405). In addition, the image transmission start command in accordance with the first preferred embodiment of the present invention is a command to start transmission of the real-time video to the image pickup device.

The processing unit 205 is in a reception standby state in which reception of the frame image transmitted from each of the image pickup devices is on standby, after transmission of the image transmission start command (step S406). The processing unit 205 displays the frame image on a predetermined region of the display unit 201 when the frame image is received from the image pickup device via the communication unit 206 (step S407). The processing unit 205 issues a frame rate change information reception start command to the acquisition unit 203 after display of the frame image. In addition, the frame rate change information reception start command in accordance with the first preferred embodiment of the present invention is a command issued to the acquisition unit 203 from the processing unit 205, and a command to start reception processing of the frame rate change information to the acquisition unit 203.

The acquisition unit 203 is in a reception standby state in which the reception of the frame rate change information is on standby, when the frame rate change information reception start command is received (step S408). The acquisition unit 203 performs the processing shown in step S411 when the frame rate change information is not received for a certain amount of time, and acquires the image pickup device displacement data from the received frame rate change information and stores the data in the storage unit 204, when the frame rate change information is received via the communication unit 206. The acquisition unit 203 issues a frame rate change information reception termination notice to the determination unit 202 after storage of the image pickup device displacement data. In addition, the frame rate change information reception termination notice in accordance with the first preferred embodiment of the present invention is a notice issued to the determination unit 202 from the acquisition unit 203, and a notice that allows the determination unit 202 to re-determine the frame rate information.

Figure 6:
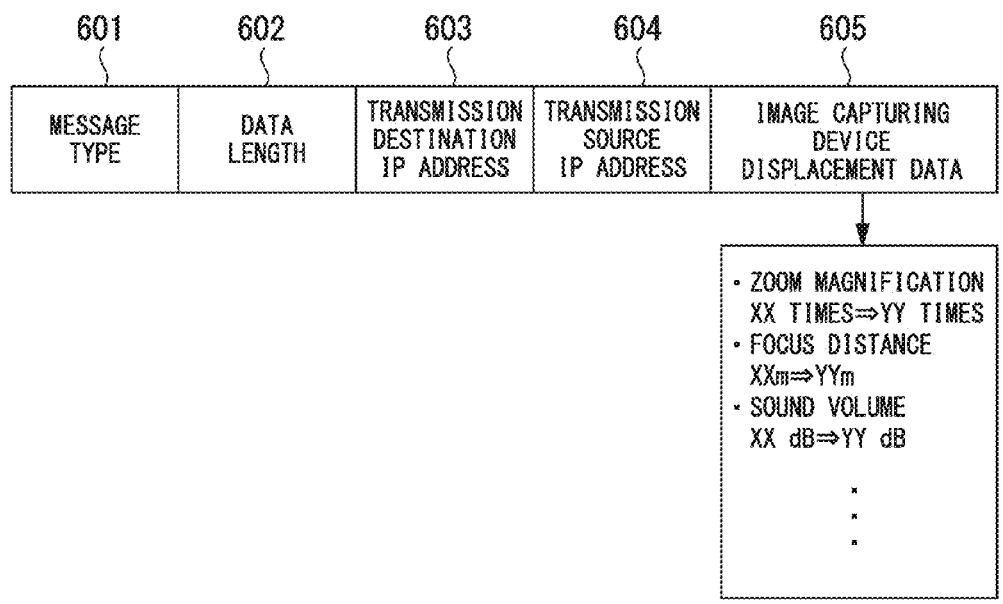
FIG. 6 is a reference view illustrating a data format of frame rate change information in accordance with the first preferred embodiment of the present invention.
Figure 7:
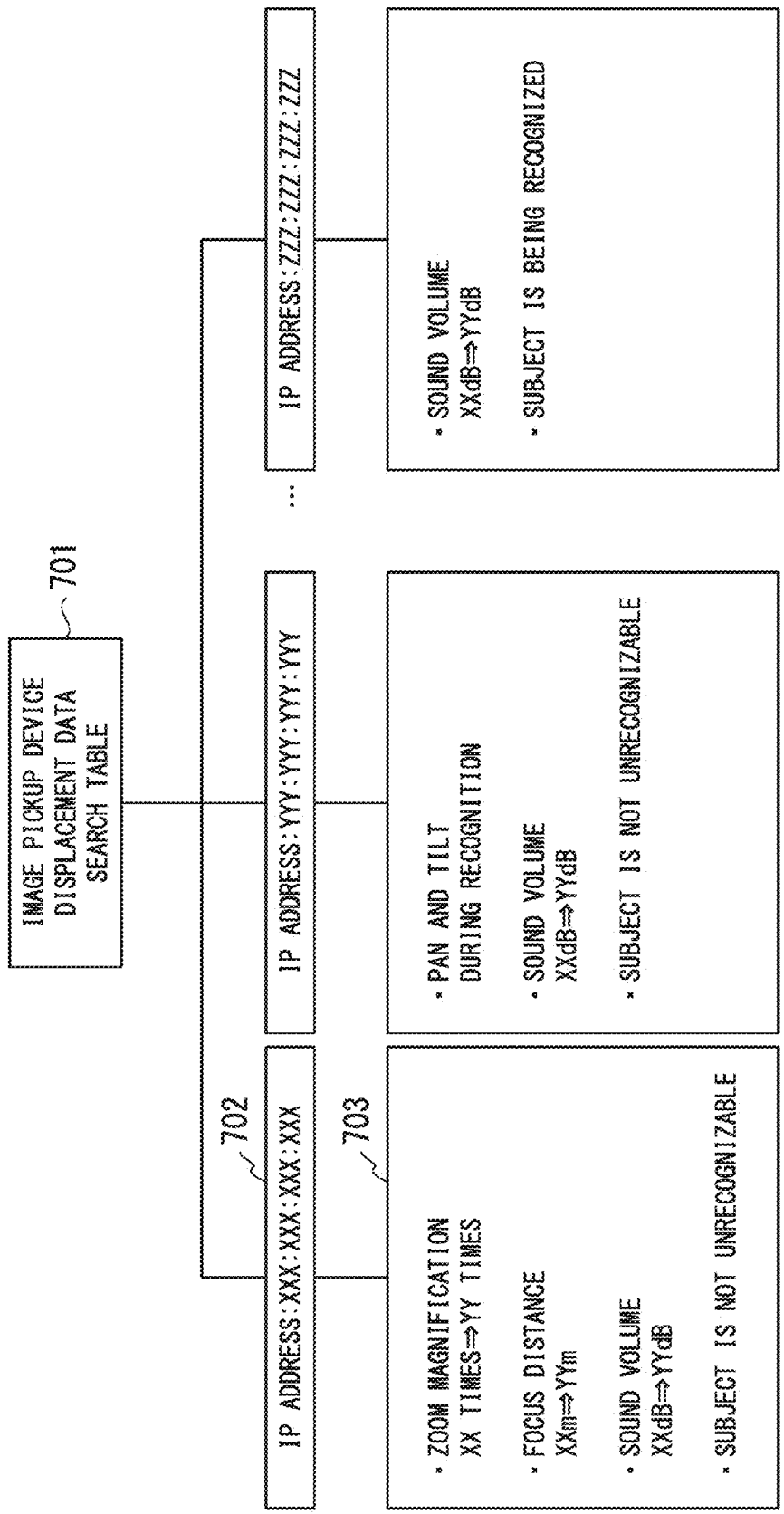
FIG. 7 is a reference view illustrating a storage format of image pickup device displacement data in accordance with the first preferred embodiment of the present invention.

In addition, the frame rate change information is information configured in a data format shown in FIG. 6. After the acquisition unit 203 acquires the image pickup device displacement data, as shown in FIG. 7, only the image pickup device displacement data is stored in the storage unit 204. The data format of the frame rate change information and a storage scheme for the image pickup device displacement data will be described later.

When the frame rate change information reception termination notice is received from the processing unit 205, the determination unit 202 re-determines the frame rate of the real-time video transmitted to the display terminal 101 from each of the image pickup devices based on the image pickup device displacement data stored in the storage unit 204 and the maximum processible amount, and stores the determined frame rate as the frame rate information in the storage unit 204 (step S409). The determination unit 202 issues the frame rate information storage termination notice to the processing unit 205 after storage of the frame rate information. In addition, the method of determining the frame rate in step S409 will be described later.

When the frame rate information storage termination notice is received, the processing unit 205 transmits the frame rate information stored in the storage unit 204 to each of the image pickup devices via the communication unit 206 (step S410). After the frame rate information is transmitted or when the frame rate change information is not received for a certain amount of time in step S408, the processing unit 205 determines whether a real-time video display end command is issued or not (step S411). The processing unit 205 performs the processing shown in step S412 when the real-time video display end command is issued, and performs re-processing from the reception processing of the frame image shown in step S406 when the real-time video display end command is not issued.

In addition, the real-time video display end command in accordance with the first preferred embodiment of the present invention is a command to end the real-time video display process performed by the display terminal 101, and a command issued before the image pickup device and the display terminal 101 are disconnected. The condition under which the command is issued is not limited the above-mentioned condition, but, for example, the command may be issued under the condition that the information related to the command issuance instruction from the image pickup device, which transmits the real-time video, be received via the communication unit 206, and the command may be issued under the condition that a user interface unit is further included in the configuration of the display terminal shown in FIG. 2 and the command is issued by a user input.

When the real-time video display end command is received, the processing unit 205 transmits the image transmission end command to each of the image pickup devices and secedes from the network (step S412). In addition, the image transmission end command in accordance with the first preferred embodiment of the present invention is a command transmitted to each of the image pickup devices from the display terminal 101, and a command to end transmission of the real-time video to the image pickup device.

The data format of the frame rate information shown in step S403, or the like, will be described with reference to FIG. 5. The frame rate information is information constituted by a message type 501, a data length 502, a transmission destination IP address 503, a transmission source IP address 504, and a frame rate definition value 505.

Data indicating that the information is the frame rate information is stored in the message type 501. A data length of the frame rate information is stored in the data length 502. An IP address of the image pickup device that designates the frame rate is stored in the transmission destination IP address 503. An IP address of the display terminal 101 that has transmitted the frame rate information is stored in the transmission source IP address 504. A definition value of the frame rate of the frame image transmitted from the image pickup device to the display terminal 101 is stored in the frame rate definition value 505.

The data format of the frame rate change information shown in step S408, or the like, will be described with reference to FIG. 6. The frame rate change information is information constituted by a message type 601, a data length 602, a transmission destination IP address 603, a transmission source IP address 604, and image pickup device displacement data 605.

Data indicating that the information is the frame rate change information is stored in the message type 601. A data length of the frame rate change information is stored in the data length 602. An IP address of the display terminal 101 is stored in the transmission destination IP address 603. An IP address of the image pickup device that has transmitted the frame rate change information is stored in the transmission source IP address 604. Photographing displacement data of the image pickup device corresponding to the transmission source IP address 604 is stored in the image pickup device displacement data 605.

A method of storing the image pickup device displacement data shown in step S408 will be described with reference to FIG. 7. The information of the image pickup device displacement data stored in the storage unit 204 is constituted by an image pickup device displacement data search table 701, an IP address 702, and image pickup device displacement data 703.

The image pickup device displacement data search table 701 is associated with the IP address 702 of the image pickup device that has acquired the image pickup device displacement data 703 retained in the storage unit 204. The IP address 702 is associated with the image pickup device displacement data 703 of a corresponding image pickup device. The image pickup device displacement data 703 include a state or a displacement amount of the framing operation such as panning and tilting or zooming, a displacement amount of a sound volume, a state of subject recognition, and so on. As described above, the image pickup device displacement data search table 701 is stored in the storage unit 204 in a state in which the IP addresses 702 assoicated with the image pickup device displacement data 703 are associated with one another.

Figure 8:
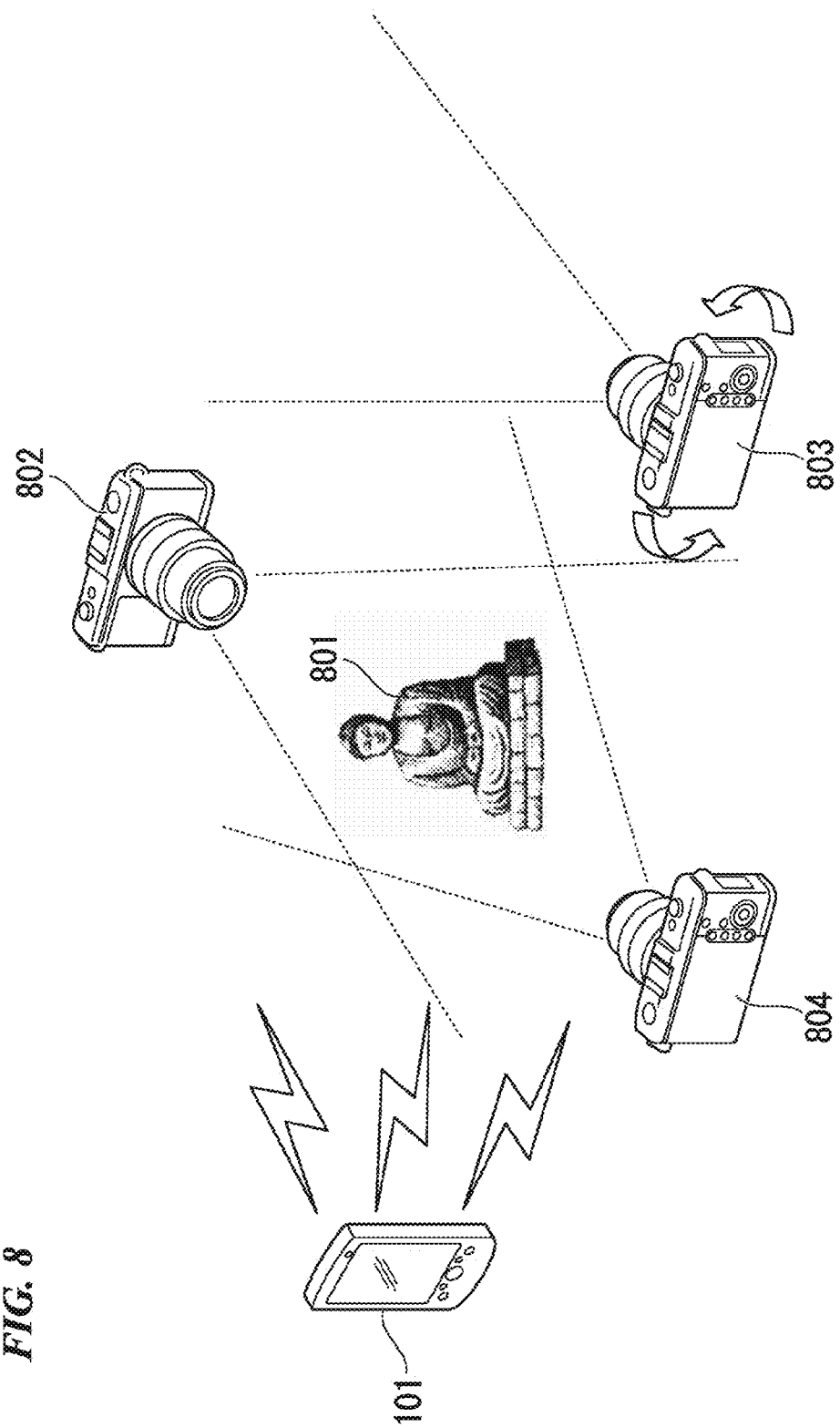
FIG. 8 is a view for explaining a method of determining a frame rate in accordance with the first preferred embodiment of the present invention.

The method of determining the frame rate shown in step S403 will be described with reference to FIG. 8. In step S403, determination of the frame rate of each of the image pickup devices is performed by evenly allocating the number of frames with respect to each of the image pickup devices based on the number of connected image pickup devices and the maximum processible amount stored in the storage unit 204. For example, in FIG. 8, provided that the maximum processible amount of the display terminal 101 is 30 fps, since the number of image pickup devices is three, that is, image pickup devices 802, 803 and 804, 10 fps is allocated to each of the image pickup devices such that the sum of the frame rates of the image pickup devices does not exceed the maximum processible amount of the display terminal 101.

The method of determining the frame rate shown in step S409 will be described with reference to FIGS. 8 to 10. In step S409, determination of the frame rate of each of the image pickup devices is performed by individually allocating the number of frames with respect to each of the image pickup devices based on the maximum processible amount stored in the storage unit 204 and the priority of each of the image pickup devices determined from the image pickup device displacement data stored in the storage unit 204.

In the first preferred embodiment, the priority of each of the image pickup devices is determined by a photographing step of each of the image pickup devices predicted from the displacement data of each of the image pickup devices. Alternatively, the priority of each of the image pickup devices is determined by comparing the displacement data of each of the image pickup devices with a priority table shown in FIG. 10.

In step S409, when determination of the priority of each of the image pickup devices is performed in the photographing step of each of the image pickup devices, the photographing step of each of the image pickup devices is predicted from the displacement data of each of the image pickup devices. For example, in FIGS. 8 and 9, the image pickup device 802 can determine the situation in which the subject 801 is in an angle of view and a zooming operation is performed from the image pickup device displacement data 901 of the image pickup device 802. For this reason, it is determined that the image pickup device 802 is in a step of composition determination.

In addition, the image pickup device 803 can determine the situation in which the subject 801 is not in the angle of view and panning and tilting are performed from the image pickup device displacement data 902 of the image pickup device 803. For this reason, the image pickup device 803 is predicted to be in a step in which capturing of the subject 801 is performed. Further, the image pickup device 804 can determine the situation in which the subject 801 is in the angle of view and the framing operation is not performed from the image pickup device displacement data 903 of the image pickup device 804. For this reason, the image pickup device 804 is predicted to be in a step in which the photographing can be performed.

After prediction of the photographing step of each of the image pickup devices, determination of the priority of each of the image pickup devices is performed. In the situation in which the framing operation is performed, movement of the subject in the real-time video is increased by movement of the image pickup device by panning and tilting, or the like. In the situation in which movement of the subject in the real-time video is large and the frame rate of the real-time video is low, a user cannot easily follow the subject and fine adjustment of the framing operation becomes difficult. For this reason, during the framing operation, i.e., in the step in which the capturing of the subject is performed, determination of high priority can be considered so that the frame rate becomes high. For example, in FIGS. 8 and 9, when the priority is determined to be high for a step farthest from the step in which the photographing can be performed, the image pickup device 803 in the step in which the capturing of the subject is performed has a high priority, the image pickup device 802 in the step of composition determination has an ordinary priority, and the image pickup device 804 in the step in which the photographing can be performed has a low priority.

In addition, since the information (priority information) indicating a relationship between each photographing step and priority is previously stored in the storage unit 204, after prediction of the photographing step, the priority is determined to correspond to the photographing step based on the information stored in the storage unit 204. Further, in the first preferred embodiment, while the priority is determined to be high for the step farthest from the step in which the photographing can be performed, the method of determining the priority based on the photographing step is not limited to the above-mentioned method. For example, a method of determining the priority as high for the step nearest to the step in which the photographing can be performed or a method of determining the priority as high at the image pickup device in the step of composition determination may be provided.

After determination of the priority, allocation of the number of frames of each of the image pickup devices is performed based on the maximum processable amount stored in the storage unit 204 and the priority of each of the image pickup devices. In addition, the weight of the priority when the priority is determined by the photographing step of each of the image pickup devices is allocated as a natural number in a sequence from the image pickup device having a low priority, and allocation of the number of frames is performed based on the maximum processable amount and the weight of the priority.

Figure 9:
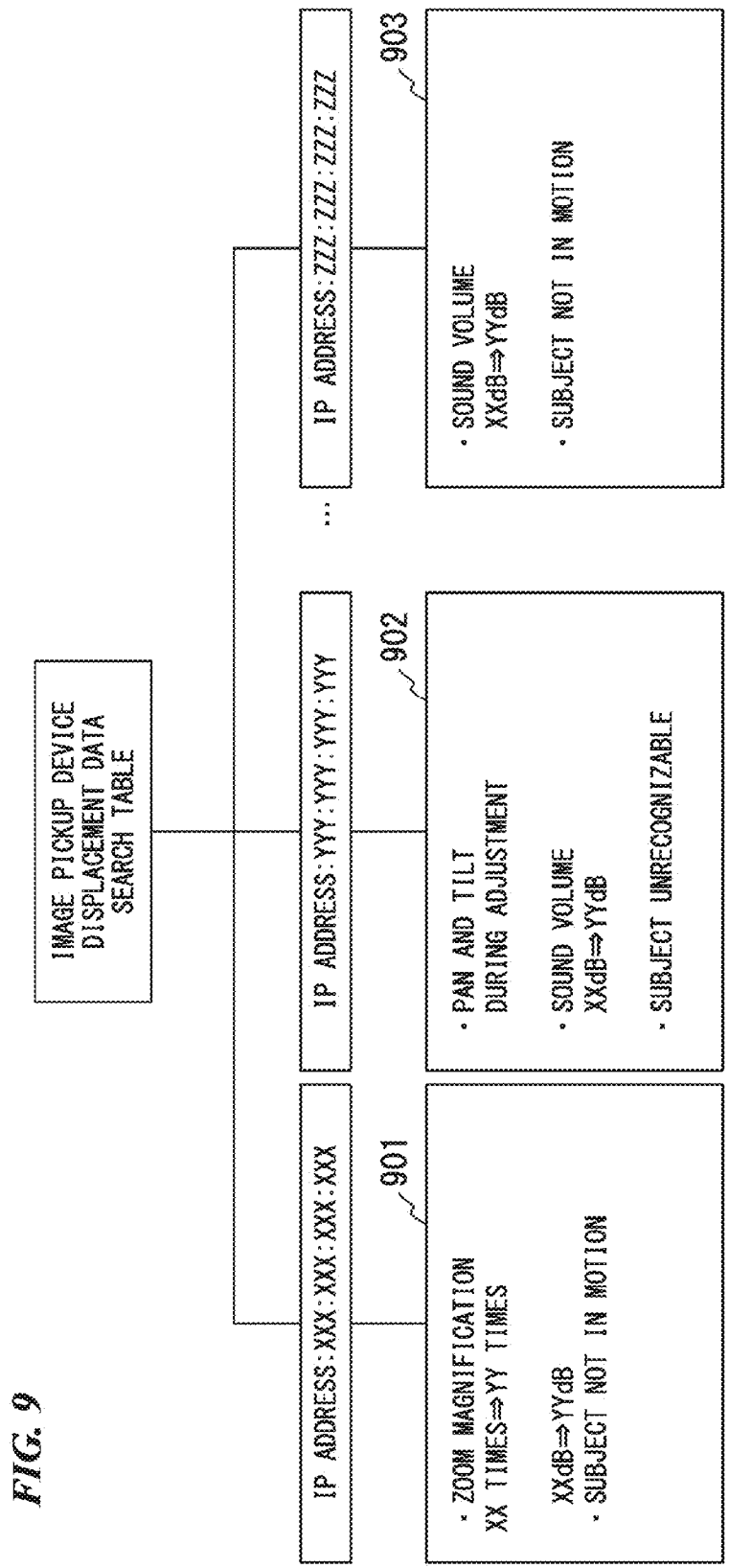
FIG. 9 is a reference view for explaining the method of determining the frame rate in accordance with the first preferred embodiment of the present invention.

For example, in FIGS. 8 and 9, the image pickup device 804 having a low priority becomes priority 1, the image pickup device 802 having an ordinary priority becomes priority 2, and the image pickup device 803 having a high priority becomes priority 3. For this reason, provided that the maximum processable amount of the display terminal 101 is 30 fps, 10 fps is allocated to the image pickup device 802 having an ordinary priority, 15 fps is allocated to the image pickup device 803 having a high priority, and 5 fps is allocated to the image pickup device 804 having a low priority, so that the sum of the frame rates of the image pickup devices does not exceed the maximum processable amount of the display terminal 101.

Meanwhile, in step S409, the case in which the priority of each of the image pickup devices is determined by comparing the displacement data of each of the image pickup devices with the priority table (priority information) shown in FIG. 10 is as follows. As shown in FIG. 10, an item of data configuring the image pickup device displacement data, detailed information belonging to the item, and the priority allocated to the detailed information thereof are associated with the priority table.

Items of the data configuring the image pickup device displacement data are framing, subject recognition, and so on. The detailed information belonging to the framing is pan, tilt, zoom, wide, focus, and so on. The detailed information belonging to the subject recognition is "unrecognizable" indicating that the subject cannot be recognized, "in motion" indicating that the subject is in motion, and "not in motion" indicating that the subject is not in motion. The others may be a change in sound volume, or the like.

As described above, in the situation in which the framing operation is performed, movement of the subject in the real-time video is increased by movement of the image pickup device by the pan and tilt, or the like, and fine adjustment of the framing operation becomes difficult. For this reason, the priority with respect to the pan or tilt is set to be a high value. In addition, since movement of the subject in the real-time video is also generated by the zooming operation, or the like, the priority with respect to the zoom, wide, and focus is set to be a next highest value of the priority with respect to the pan and tilt.

Meanwhile, in the subject recognition, in order for the user to easily find the subject when the subject cannot be recognized, the priority with respect to "unrecognizable" is set to be a high value. In addition, in order for the user to easily find the subject even when the subject is in motion, the priority with respect to "in motion" is set to be the next highest value of the priority with respect to "unrecognizable."

In determination of the priority of each of the image pickup devices using the priority table, comparison of the displacement data of each of the image pickup devices with the priority table is performed, and the sum of the priority of the item corresponding to the image pickup device displacement data shown in the priority table is determined as the priority of each of the image pickup devices. After determination of the priority, allocation of the number of frames of each of the image pickup devices is performed based on the maximum processable amount stored in the storage unit 204 and the priority of each of the image pickup devices. In addition, when the priority of each of the image pickup devices is determined using the priority table, allocation of the number of frames is performed based on the maximum processable amount and the weight of the priority.

For example, in FIGS. 8, 9 and 10, when the displacement data of each of the image pickup devices is compared with the priority table, the priority of each of the image pickup devices is as follows. In addition, the image pickup device 802 corresponds to the image pickup device displacement data 901, the image pickup device 803 corresponds to the image pickup device displacement data 902, and image pickup device 804 corresponds to the image pickup device displacement data 903. The priority of the image pickup device 802 becomes 7(=5+1+1), the priority of the image pickup device 803 becomes 21(=10+1+10), and the priority of the image pickup device 804 becomes 2(=1+1). For this reason, provided that the maximum processable amount of the display terminal 101 is 30 fps, 7 fps are allocated to the image pickup device 802, 21 fps are allocated to the image pickup device 803, and 2 fps are allocated to the image pickup device 804, so that the sum of the frame rate of each of the image pickup devices does not exceed the maximum processable amount of the display terminal 101.

In addition, while the priority table shown in FIG. 10 has been used as the priority table in accordance with the first preferred embodiment of the present invention, the priority table is not limited to FIG. 10. For example, in addition to variation of each framing operation, a movement amount of the subject, change in sound volume, etc., the priority table may have different weights of priorities according to the respective variations.

Figure 11:
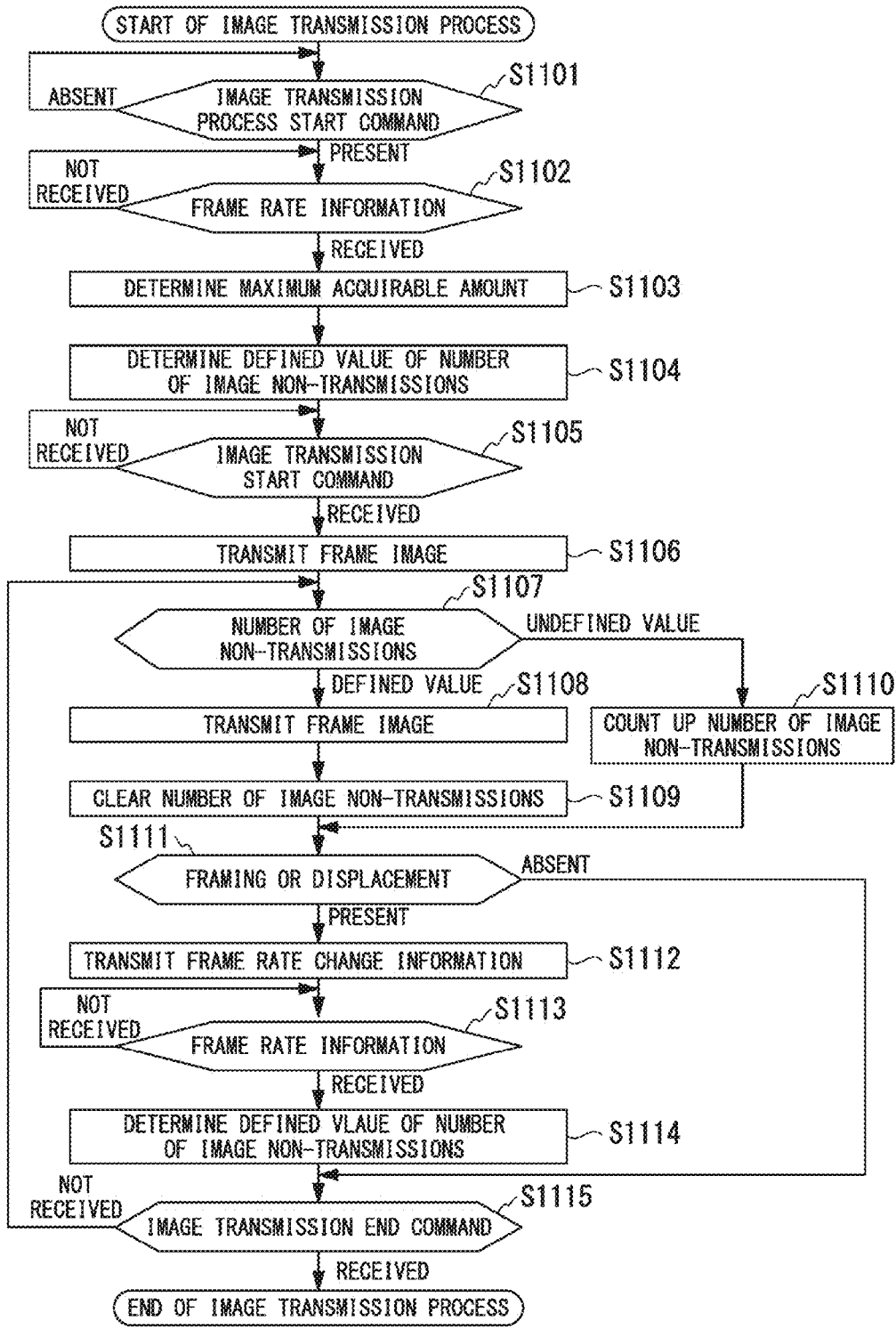
FIG. 11 is a flowchart illustrating a sequence of operations of the image pickup device in accordance with the first preferred embodiment of the present invention.

FIG. 11 shows an operation of the image pickup device in accordance with the first preferred embodiment of the present invention. Hereinafter, the operation of the image pickup device will be described with reference to FIG. 11.

The processing unit 302 starts an image transmission process when an image transmission process start command is received (step S1101). In addition, the image transmission process start command in accordance with the first preferred embodiment of the present invention is a command that allows the image pickup device to start the image transmission process, and a command issued under the condition that the display terminal 101 and the image pickup device belong to the same network. The condition under which the command is issued is not limited to the above-mentioned condition, but, for example, the condition may be a condition that a command is issued by receiving information related to a command issuance instruction via the communication unit 305 from the display terminal 101 belonging to the same network, or a condition that a user interface unit is further included in the configuration of the image pickup device shown in FIG. 3 and the command is issued by user input.

The processing unit 302 is in a reception standby state in which reception of the frame rate information is on standby after a start of the image transmission process (step S1102). The processing unit 302 determines the maximum obtainable amount when the frame rate information is received via the communication unit 305, and stores the frame rate information and the maximum obtainable amount in the storage unit 304 (step S1103). The processing unit 302 determines a defined value of the number of image non-transmissions, after storage of the frame rate information and the maximum obtainable amount, based on the frame rate information and the maximum obtainable amount, and stores the value in the storage unit 304 (step S1104).

As described above, the maximum obtainable amount is information indicating the frame rate of the real-time video acquired by the image pickup device. In addition, the number of image non-transmissions is the number of times to skip a transmission process of frame images to be transmitted from the image pickup device to the display terminal 101. Further, a defined value of the number of image non-transmissions is a value calculated based on a definition value of the frame rate added to the frame rate information and the maximum obtainable amount. For example, provided that a definition value of the frame rate is 5 fps and the maximum obtainable amount is 30 fps, when 30 fps is changed with 5 fps, since the frame image may be transmitted once at 6 frames, the defined value of the number of image non-transmissions is calculated as 6. Furthermore, separately from the defined value of the number of image non-transmissions, the number of image non-transmissions is stored in the storage unit 304, and a value after clear is set to the number of image non-transmissions.

The processing unit 302 is in a reception standby state in which reception of the image transmission start command after storage of the defined value of the number of image non-transmissions (step S1105). When the image transmission start command is received via the communication unit 305, the processing unit 302 transmits the latest frame image of the real-time video obtained by the image capturing unit and sequentially stored in the storage unit 304 to the display terminal 101 via the communication unit 305 (step S1106).

After transmission of the frame image in step S1106, the processing unit 302 determines whether the number of image non-transmissions stored in the storage unit 304 is equal to the defined value of the number of image non-transmissions stored in the storage unit 304 (step S1107). The processing unit 302 performs processing shown in step S1108 when the number of image non-transmissions is equal to the defined value of the number of image non-transmissions, and performs processing shown in step S1110 when unequal to the defined value. When the number of image non-transmissions processed in step S1107 is equal to the defined value of the number of image non-transmissions, the processing unit 302 transmits the latest frame image of the real-time video stored in the storage unit 304 to the display terminal 101 via the communication unit 305 (step S1108), and clears the number of image non-transmissions (step S1109). After clearance of the number of image non-transmissions, the processing unit 302 issues an image pickup device displacement data acquisition command to the acquisition unit 303. In addition, the image pickup device displacement data acquisition command in accordance with the first preferred embodiment of the present invention is a command issued to the acquisition unit 303 from the processing unit 302, and a command to start a photographing situation of the image pickup device with respect to the acquisition unit 303 or acquisition of the displacement amount of the subject in photographing.

Meanwhile, when the number of image non-transmissions processed in step S1107 is not equal to the defined value of the number of image non-transmissions, the processing unit 302 counts up the number of image non-transmissions (step S1110). After the number of image non-transmissions is counted up, the processing unit 302 issues the image pickup device displacement data acquisition command to the acquisition unit 303.

In step S1109 or step S1110, when the image pickup device displacement data acquisition command is received from the processing unit 302, the acquisition unit 303 performs acquisition of the image pickup device displacement data and determines whether the acquired photographing situation or the displacement amount of the subject is varied or not (step S1111). In addition, the image pickup device displacement data acquired by the acquisition unit 303 is stored in the storage unit 304, and in step S1111, determination is performed by comparing the photographing situation or the displacement amount of the subject acquired from the finally acquired image pickup device displacement data with the photographing situation or the displacement amount of the subject acquired from the image pickup device displacement data acquired one time before the finally acquired image pickup device displacement data.

When there is a variation in a photographing situation or displacement amount of the subject, the acquisition unit 303 adds the image pickup device displacement data to the frame rate change information and stores the added result in the storage unit 304, and issues a frame rate change information storage termination notice to the processing unit 302. Meanwhile, when there is no variation in a photographing situation or displacement amount of the subject, processing shown in step S1115 is performed. In addition, the frame rate change information storage termination notice in accordance with the first preferred embodiment of the present invention is a command issued to the processing unit 302 from the acquisition unit 303, and a command that allows transmission of the frame rate change information to the processing unit 302.

When the frame rate change information storage termination notice is received, the processing unit 302 transmits the frame rate change information stored in the storage unit 304 to the display terminal 101 via the communication unit 305 (step S1112). After transmission of the frame rate change information, the processing unit 302 is in the reception standby state in which reception of the frame rate information is on standby (step S1113). When the frame rate information is received via the communication unit 305, the processing unit 302 stores the received frame rate information in the storage unit 304, and performs processing shown in step S1114.

After storage of the frame rate information received in step S1113, the processing unit 302 updates the defined value of the number of image non-transmissions based on the frame rate information received in step S1113 and stored in the storage unit 304 and the maximum obtainable amount stored in the storage unit 304 in step S1103 (step S1114).

After the defined value of the number of image non-transmissions is updated in step S1114 or when it is determined that there is no variation in a photographing situation or displacement amount of the subject in step S1111, the processing unit 302 determines whether the image transmission end command is received from the display terminal 101 (step S1115). When the image transmission end command is received, the processing unit 302 stops transmission of the real-time video to the display terminal 101 and ends the image transmission process. Meanwhile, when the image transmission end command is not yet received, the processing unit 302 performs processing again from determination of the number of image non-transmissions shown in step S1107.

Effects According to the Preferred Embodiment

The preferred embodiment of the present invention is as described above. According to the preferred embodiment of the present invention, since a data amount of the frame image transmitted from each of the image pickup devices is determined such that the sum of the data amount (frame rate) of the frame image transmitted from each of the image pickup devices does not exceed the maximum processible amount of the display terminal, a processing load related to the image display in the display terminal can be reduced. In addition, based on the photographing operation related to the frame image, the photographing environment, the image pickup device displacement data indicating a state of the photographed subject, and information related to the priority, as a high data amount is primarily allocated to the image pickup device in a state in which the user requires information amount, image display in which the priority of the image is reflected can be performed such that the information amount of the video in which the user requires the information amount is not reduced.

In addition, since the information related to the framing operation of the image pickup device is included in the image pickup device displacement data, based on the framing operation such as pan and tilt, zoom-wide, focus, etc., in each of the image pickup devices, the data amount of the frame image transmitted to the display terminal from each of the image pickup devices can be determined.

Further, since the information related to the sound volume detected by the image pickup device is included in the image pickup device displacement data, based on the peripheral sound volume detected by each of the image pickup devices, the data amount of the frame image transmitted to the display terminal from each of the image pickup devices can be determined.

Furthermore, since the information related to whether the subject present in the frame image is recognized is included in the image pickup device displacement data, based on whether the subject present in the frame image is recognized, the data amount of the frame image transmitted to the display terminal from each of the image pickup devices can be determined.

In addition, since the information related in the movement amount in the frame image of the subject present in the frame image is included in the image pickup device displacement data, based on the movement amount of the subject present in the frame image, the data amount of the frame image transmitted to the display terminal from each of the image pickup devices can be determined.

(Variant)

While the preferred embodiment of the present invention has been described as above, the present invention is not limited to the preferred embodiment of the present invention.

(First Variant)

Figure 12A:
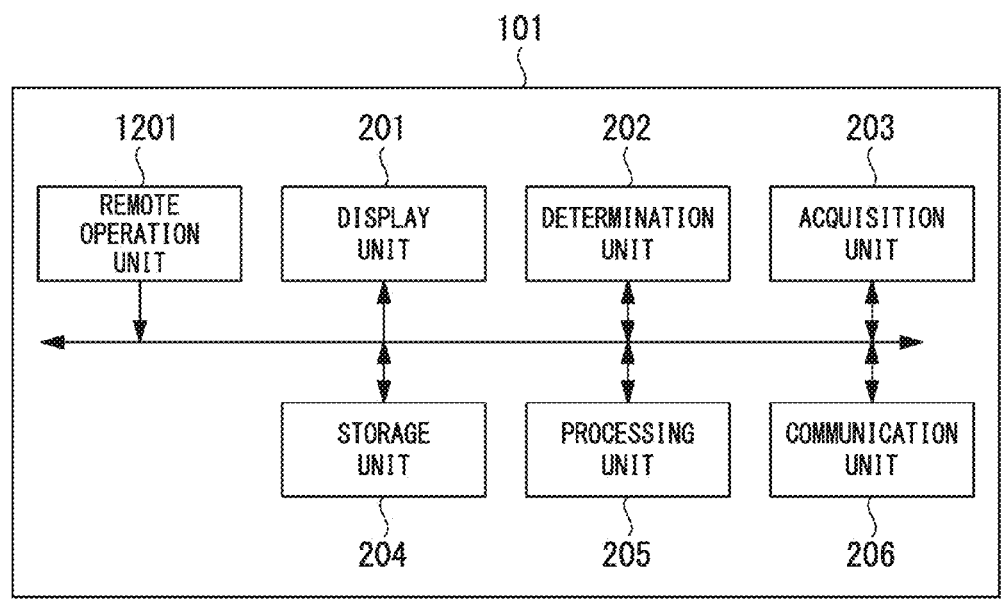
FIGS. 12A and 12B are block diagrams illustrating configurations of a display terminal and an image pickup device of a first variant in accordance with the first preferred embodiment of the present invention.

For example, as shown in FIG. 12A, the display terminal 101 may further include a remote operation unit 1201 configured to instruct the photographing situation in the image pickup device so that the photographing situation of the image pickup device can be instructed from the display terminal 101. The remote operation unit 1201 is configured to receive an operation related to the photographing situation from the user, and the processing unit 205 transmits the information of the photographing situation received by the remote operation unit 1201 from the user to the image pickup device via the communication unit 206. In the image pickup device, the processing unit 302 receives the information of the photographing situation transmitted from the display terminal 101 via the communication unit 305, and controls a state of the image capturing unit 301 based on the received information of the photographing situation.

Figure 12B:
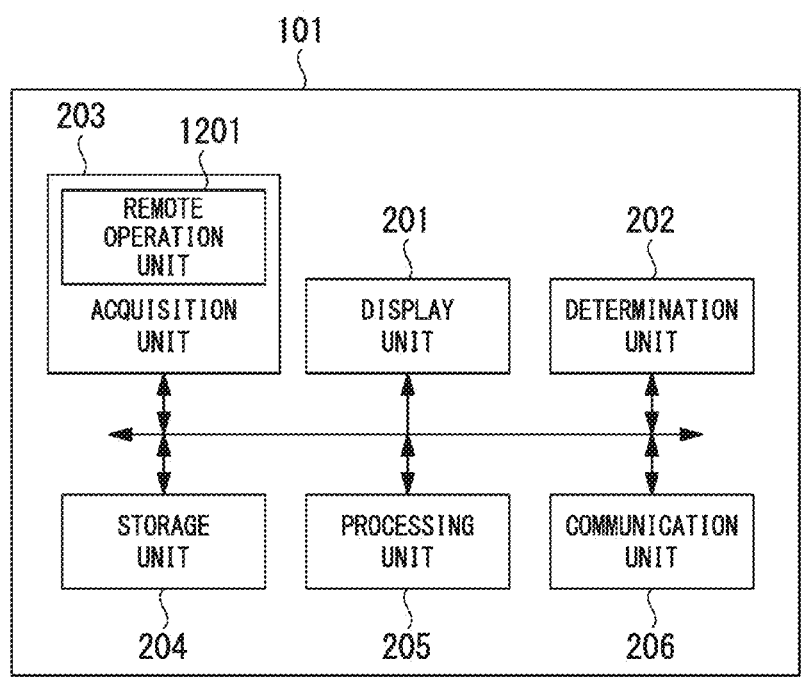

In addition, in the system represented as a first variant, as shown in FIG. 12B, based on variation in a photographing situation of the image pickup device in which the remote operation unit 1201 is treated as a portion of the acquisition unit 203 and performed using the remote operation unit 1201, allocation of the number of frames of each of the image pickup devices in the display terminal 101 may be performed. The remote operation unit 1201 is configured to receive an operation related to the photographing situation from the user, and the acquisition unit 203 acquires the image pickup device displacement data from the information of the photographing situation received by the remote operation unit 1201 from the user. Further, when the display terminal 101 is configured as shown in FIG. 12B, the image pickup device may not have the acquisition unit 303.

(Second Variant)

Figure 13:
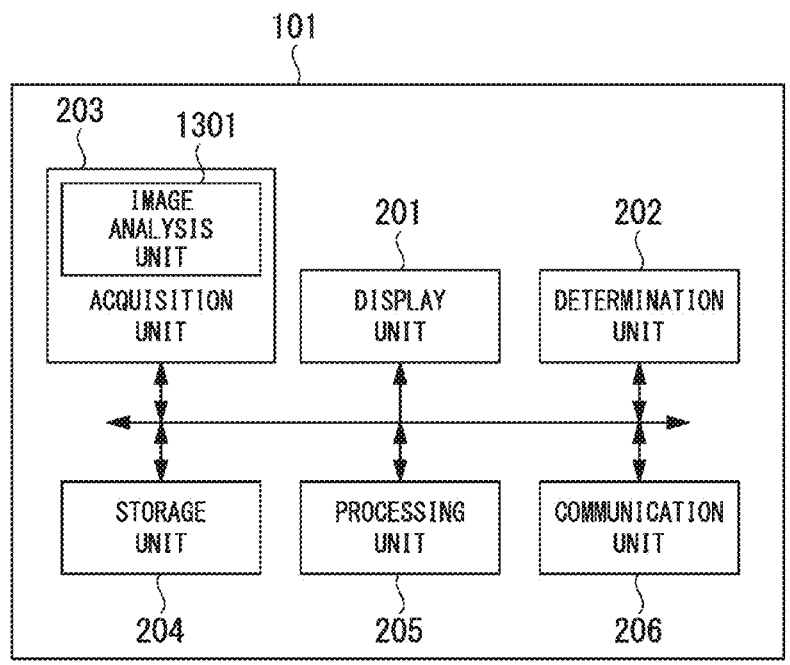
FIG. 13 is a block diagram illustrating a configuration of a display terminal of a second variant in accordance with the first preferred embodiment of the present invention.

For example, as shown in FIG. 13, the acquisition unit 203 of the display terminal 101 may further include a video analysis unit 1301 configured to analyze the frame image transmitted from the image pickup device, so that allocation of the number of frames of each of the image pickup devices in the display terminal 101 is performed based on variation of the subject acquired by the video analysis unit 1301 through analysis of the frame image. The acquisition unit 203 acquires the image pickup device displacement data from the variation of the subject acquired by the video analysis unit 1301 through analysis of the frame image. In addition, when the display terminal 101 is configured as shown in FIG. 13, the image pickup device may not have the acquisition unit 303.

(Third Variant)

Figure 14:
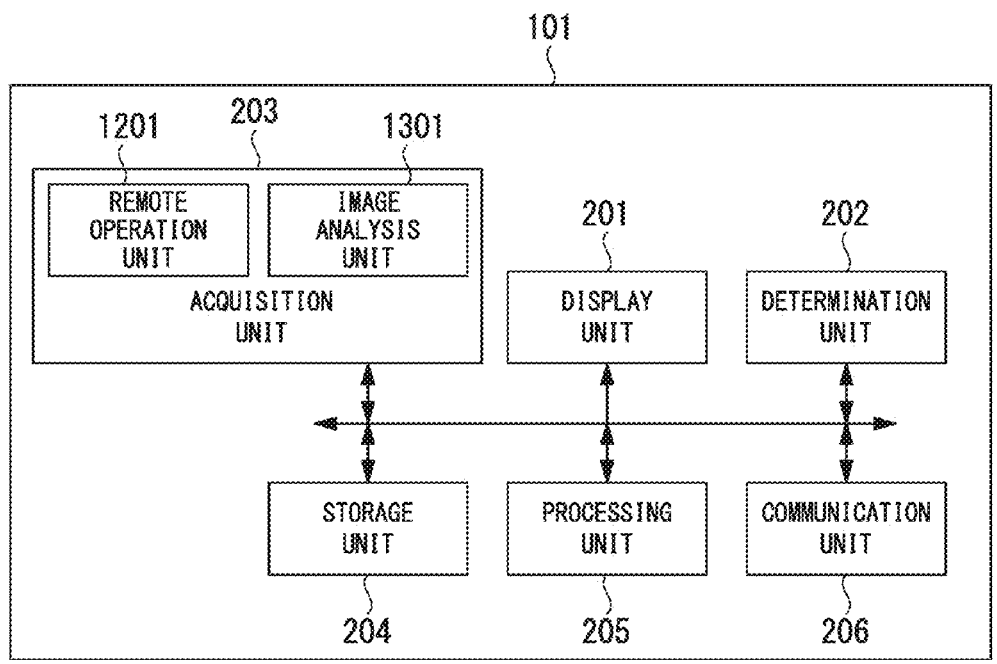
FIG. 14 is a block diagram illustrating a configuration of a display terminal of a third variant in accordance with the first preferred embodiment of the present invention.

For example, as shown in FIG. 14, the acquisition unit 203 in the display terminal 101 may further include the remote operation unit 1201 shown in FIG. 12 and the video analysis unit 1301 shown in FIG. 13, so that allocation of the number of frames of each of the image pickup devices in the display terminal 101 is performed based on variation in a photographing situation of the image pickup device performed using the remote operation unit 1201 and variation of the subject analyzed by the video analysis unit 1301. In addition, when the display terminal 101 is configured as shown in FIG. 14, the image pickup device may not have the acquisition unit 303.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. An image display device comprising:
   a communication unit configured to receive frame images sequentially transmitted from each of a plurality of image pickup devices;
   a display unit configured to display the frame images from each of the plurality of image pickup devices that have been received by the communication unit;
   a storage unit configured to store processible information on an amount of the frame images that can be processed within a predetermined period of time, and store priority information indicating priorities of the frame images previously determined with respect to a photographing operation, a photographing environment, or a state of a photographed subject related to the frame images that have been received by the communication unit;

an acquisition unit configured to acquire status information indication the photographing operation, the photographing environment, or the state of the photographed subject for each of the image pickup devices;

a determiner configured to determine a frame rate information of images transmitted by each of the image pickup devices within a predetermined period of time based on the processible information and the priority information stored in the storage unit and the status information acquired by the acquisition unit; and a controller configured to perform control that causes a frame rate information of images determined by the determiner to be transmitted from the communication unit to each of the plurality of image pickup devices, wherein the frame rate information of images to be displayed is determined based on both information from the image pickup device and information from the display unit.

2. The image display device according to claim 1, wherein the acquisition unit acquires the status information based on data transmitted from the image pickup device with the frame image.

3. The image display device according to claim 1, further comprising:

a remote operation unit configured to instruct the photographing operation with respect to the image pickup device, wherein the acquisition unit acquires the status information based on the photographing operation instructed by the remote operation unit.

4. The image display device according to claim 1, further comprising:

an analyzer configured to analyze a displacement amount of the photographed subject based on the frame image, wherein the acquisition unit acquires the status information based on a result of the analysis by the analyzer.

5. The image display device according to claim 1, wherein the status information is information on a framing operation of the image pickup device.

6. The image display device according to claim 1, wherein the status information is information on a sound volume detected by the image pickup device.

7. The image display device according to claim 1, wherein the status information is information on whether the subject present in the frame image is recognizable.

8. The image display device according to claim 1, wherein the status information is information on a movement amount in the frame image of the subject present in the frame image.

* * * * *